United States Patent [19]
O'Brien et al.

[11] Patent Number: 5,950,410
[45] Date of Patent: Sep. 14, 1999

[54] HYDRAULICALLY POWERED BALER PLUNGER DRIVE MECHANISM

[75] Inventors: Stephen Edwin O'Brien; Darin Ledru Roth, both of Ottumwa, Iowa

[73] Assignee: Deere & Company, Moline, Ill.

[21] Appl. No.: 09/034,091

[22] Filed: Mar. 3, 1998

[51] Int. Cl.⁶ .................................................. A01D 39/00
[52] U.S. Cl. ........................ 56/341; 56/432; 56/440; 56/443; 56/446; 100/88
[58] Field of Search ............................. 56/432, 436, 440, 56/443, 446, 341, 343; 100/88

[56] References Cited

U.S. PATENT DOCUMENTS

| | | | |
|---|---|---|---|
| 4,202,262 | 5/1980 | Claas et al. ................................ | 100/4 |
| 4,524,574 | 6/1985 | Ratzlaff .................................... | 56/341 |
| 4,782,651 | 11/1988 | Ratzlaff .................................... | 56/341 |
| 4,829,756 | 5/1989 | Schrag et al. ............................. | 56/341 |
| 4,945,719 | 8/1990 | Schrag et al. ............................. | 56/341 |
| 5,090,307 | 2/1992 | Lippens et al. ........................... | 100/35 |
| 5,092,114 | 3/1992 | Eggenmueller ........................... | 56/341 |
| 5,123,338 | 6/1992 | Mathis ...................................... | 100/43 |
| 5,301,607 | 4/1994 | Stromer et al. ........................... | 100/98 |
| 5,456,075 | 10/1995 | Meijer ....................................... | 56/341 |
| 5,479,766 | 1/1996 | Ransom ..................................... | 56/341 |
| 5,752,374 | 5/1998 | Allworden et al. ....................... | 56/341 |
| 5,768,872 | 6/1998 | Von Allworden ........................ | 56/432 |

Primary Examiner—Thomas B. Will
Assistant Examiner—Arpad Fabian Kovacs

[57] ABSTRACT

The plunger of a baler for making parallelepiped bales is driven by an extensible and retractable hydraulic actuator that is connected for oscillating a link forming a crank coupled to the plunger by a connecting link. The dimensions and locations of the crank and connecting link relative to the hydraulic actuator results in the plunger being moved in the baling chamber through a distance which is about twice the stroke of the actuator when the plunger is moved from a fully retracted position, at one side of an inlet used for introducing crop into the chamber, to a fully extended position at an opposite side of the inlet from the fully retracted position.

8 Claims, 4 Drawing Sheets

યા5,950,410

HYDRAULICALLY POWERED BALER PLUNGER DRIVE MECHANISM

BACKGROUND OF THE INVENTION

The present invention relates to drive mechanisms for plungers of balers for making parallelepiped bales, and more particularly, relates to hydraulically powered plunger drives.

It is common baling practice to use a reciprocating plunger to compact charges of cut vegetation within a baling chamber. Reciprocation of the plunger is usually effected either by a tractor power take-off driven mechanism including a rotating crank coupled to the plunger by a connecting rod, or by a hydraulic cylinder having its piston rod coupled directly to the plunger. An example of a typical power take-off driven mechanism is illustrated in U.S. Pat. No. 4,524,574, issued Jun. 25, 1985, while an example of a typical hydraulically driven plunger is illustrated in U.S. Pat. No. 4,202,262, issued May 13, 1980.

The simplicity of using a hydraulic piston and cylinder unit (hydraulic actuator), as shown in the above-identified patent, for driving a plunger is desirable, but this structure has the drawback of requiring a hydraulic actuator of substantial length in order to produce the desired travel of the plunger and of requiring a hydraulic pump having a displacement chosen for supplying the volume of fluid necessary for stroking the plunger drive actuator at the speed required for baling operation.

SUMMARY OF THE INVENTION

According to the present invention there is provided an improved hydraulically powered mechanism for driving the plunger of a baler for making parallelepiped bales.

An object of the invention is to provide a drive mechanism, for a baler plunger, which incorporates an extensible and retractable hydraulic actuator connected to a slider-crank linkage such that for a given stroke of the actuator the plunger will be moved approximately twice the stroke distance.

Yet another object of the invention is to provide a drive mechanism, as set forth in the immediately preceding object, wherein the moment arm between the actuator and the plunger increases as the plunger reaches its fully extended position.

Still another object of the invention is to provide a drive mechanism, as set forth above, which is relatively compact in a direction extending longitudinally of the baling chamber.

Another object of the invention is to provide a plunger drive as set forth in the above objects wherein a variable displacement, reversible pump is used for supplying fluid to the hydraulic actuator and is controlled in such a way that there is a dwell in the plunger motion which takes place at the point where the plunger is fully extended.

These and other objects will become apparent from a reading of the ensuing description together with the appended drawings.

DESCRIPTION OF THE PREFERRED EMBODIMENT

Figure 1:
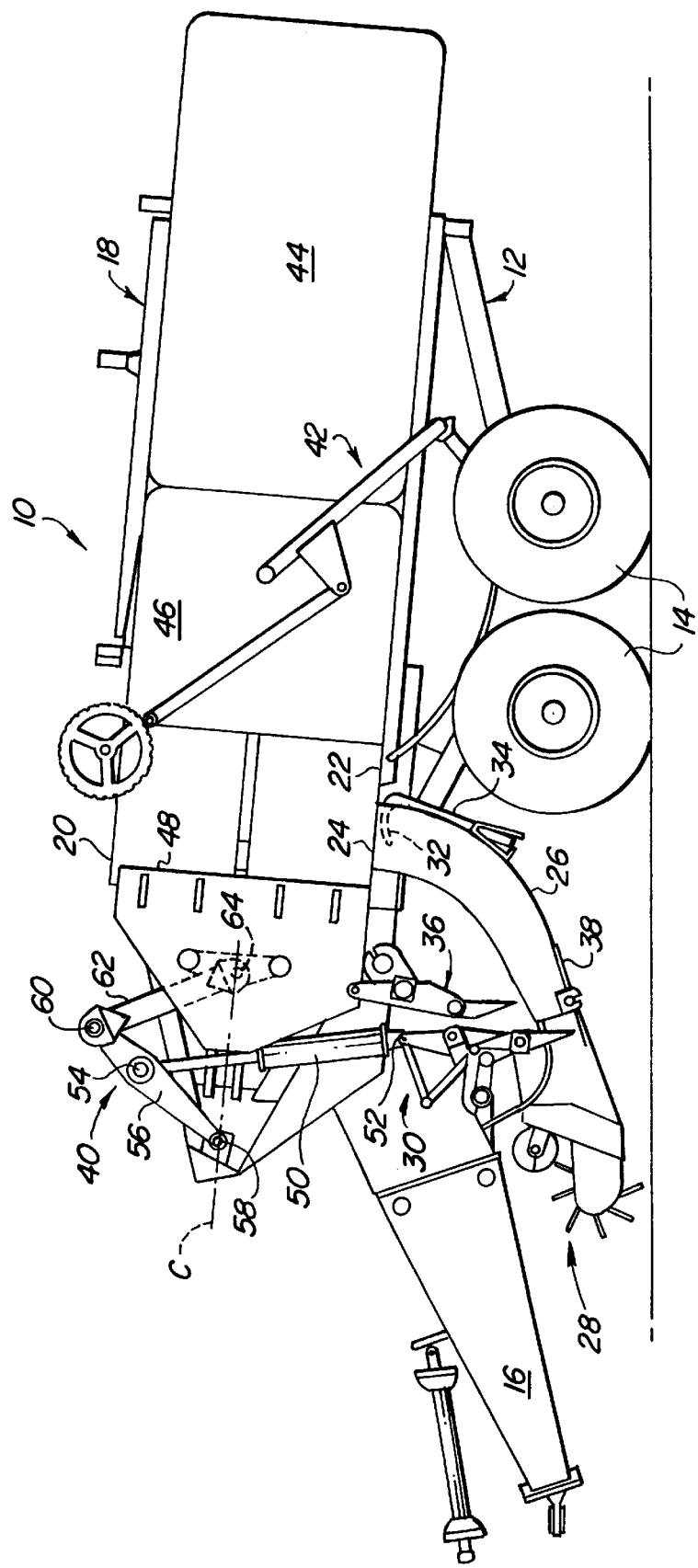
FIG. 1 is a somewhat schematic, left side elevational view of a baler for producing rectangular bales and incorporating a plunger drive mechanism of the present invention, with the bale case crop feed duct being shown in section and with the plunger actuator fully extended and the slider-crank mechanism and the plunger shown fully retracted.
Figure 2:
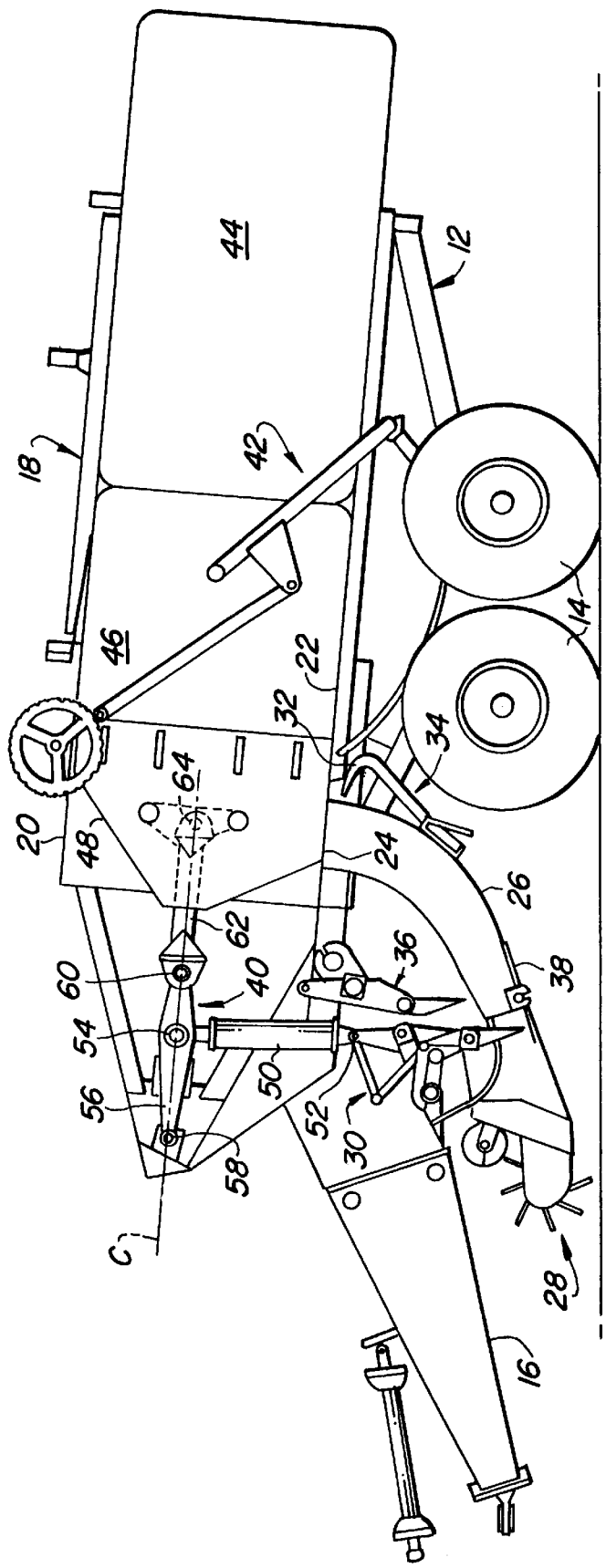
FIG. 2 is a view like FIG. 1 but showing the plunger actuator fully retracted and the slider-crank mechanism and the plunger fully extended.

Referring now to the FIGS. 1 and 2, there is shown a baler 10 for making parallelepiped bales and including a frame 12 supported on a tandem set of ground wheels 14. A tongue 16 is fixed to and extends forwardly from the frame 12 and is adapted for being attached to a prime mover, such as an agricultural tractor (not shown) equipped with a power take-off shaft for supplying power for driving various driven components of the baler. A baling chamber or bale case 18 of rectangular cross section is defined in part by upper and lower walls 20 and 22, respectively, with the lower wall 22 being provided with a crop inlet 24 to which is attached a curved in-feed duct 26 which serves as a pre-compression chamber, as described below. A crop pick-up and center-feed auger assembly 28 is provided ahead of the duct for picking up a windrow of crop from the ground and delivering it to a packer fork assembly 30 which acts to pack crop into the duct 26 until a charge of a pre-selected density has accumulated downstream of fingers 32 of a backstop device 34, the device 34 being pivotally mounted for movement between a blocking position, wherein the fingers 32 project into the duct 26 in the vicinity of the inlet 24 (FIG. 1), and a feed position, wherein the fingers are withdrawn from the duct 26 (FIG. 2) to permit the charge of crop material to be stuffed into the baling chamber 18 via the inlet 24 by a stuffer fork assembly 36. Located in a lower front location of the duct 26 is a pivotally mounted, spring-loaded door 38 that pivots, in response to crop material located in the duct achieving a desired density, to effect energization of an electrical control circuitry (not shown) which actuates appropriate drive couplings which first cause the backstop device 34 to rotate so as to withdraw the fingers 32 from their blocking position shown in FIG. 1, and a then to actuate the stuffer fork assembly 36 such that forks thereof sweep through the duct 26 and move the charge of material into the baling chamber 18. Once the charge of crop material is stuffed into the baling chamber 18, a plunger mechanism 40, which is mounted to a forward location of the frame 12 and forms the subject of the present invention described in further detail below, is operated, in controlled sequence after operation of the feeder fork assembly 36, to move the material rearwardly in the chamber 18 where it is compacted into a column, as is well known in the art. Upon the column of compressed crop material reaching a preselected length, a twine-delivery needle assembly 42, including a plurality of curved needles, is actuated to deliver a plurality of strands of twine respectively to a plurality of knotters (not shown) which act to tie lengths of twine about the preselected column length to form a bale 44 that is then ready for discharge, which will occur upon it being forced from the rear end of the chamber 18 by a bale portion 46 as it grows in length upon new charges of crop being stuffed into the chamber.

Returning now to the details of the plunger mechanism 40, it can be seen that the latter includes a plunger 48 mounted for reciprocating in the baling chamber 18 between a retracted position forwardly of the inlet 24, as illustrated in FIG. 1, and an extended position rearwardly of the inlet 24, as illustrated in FIG. 2. This movement of the plunger 48 results in charges of crop, fed into the chamber 18 from the duct 26, being compacted against a column of crop material including the partially formed bale 46 and/or the completed bale 44. The plunger mechanism 40 further includes an extensible and retractable actuator 50, here shown as a double-acting hydraulic cylinder and piston unit, having its cylinder end pivotally anchored, as by pin 52, to the frame 12 at a location above the packer assembly 30. The rod end of the actuator 50 is pivotally coupled, as at a pin 54, to a location intermediate opposite ends of a crank arm 56 having its forward end pivotally attached to the frame 12 at a location 58. A rear end of the crank arm 56 is pivotally attached, as by a pin 60, to a forward end of a connecting rod 62 having its rear end pivotally attached, as by a pin 64, to a central location of the plunger 48. It is here noted that the connection pins 58 and 64 are located along a line of centers C which lies along or approximately lies along a central, longitudinal axis of the baling chamber 18. This results in the reaction force of the crop acting on the plunger 48 being substantially removed from the actuator 50 when the crank arm 56 and connecting rod 62 are located along the line C, as is the case when the plunger 48 is in its fully extended position shown in FIG. 2. It is further noted that the crank 56 and connecting rod 62 could each be constructed of a pair of laterally spaced links. The actuator 50 would then be connected to the pin 54 at a location between the pair of links forming the crank arm 56. The pin 64 would then extend between the pair of links forming the connecting rod 62 and pass through a bracket forming part of the plunger 48. Thus, it will be appreciated that the plunger 48 forms the slider of a slider-crank mechanism including the crank arm 56 and connecting rod 62. Although it doesn't move over center, the linkage defined by the crank arm 56 and connecting rod 62 could be called a toggle mechanism or linkage. Further, while the preferred embodiment shows the actuator 50 coupled to crank arm 56 at a location between opposite ends of the arm, the actuator 50 could be coupled at any location between the crank arm pin 58 and the connecting rod pin 64, for example the actuator 50 could be coupled at the pin 60 or to a point along the length of the connecting rod 62, with the operation still being in a beneficial manner as compared to the prior art devices of the type having the actuator coupled directly to the plunger.

In any event, it is important to note that the leverage exerted by the crank arm 56 and connection rod 62 on the plunger 48 will increase as the actuator 50 moves from its fully extended position (FIG. 1) to its fully retracted position (FIG. 2). This matches exactly the force requirements of the system since the plunger 48 will meet with increased resistance as it moves to the rear in the baling chamber 18 for compacting a charge of crop material against the compressed column of crop contained in the chamber. Not only does the crank arm 56 and connecting rod 62 function to increase force output at the connection with the plunger 48 as the plunger moves rearwardly, but they also act to move the plunger 48 rearwardly through a distance which is approximately twice that of the stroke of the hydraulic actuator 50. Accordingly, the length of the actuator 50 and the displacement of the pump supplying fluid thereto can be minimized, thus resulting in a cost savings over the prior art system where the length of the actuator is determined by the distance through which the plunger must be moved when traveling between its fully retracted and extended positions.

Figure 3:
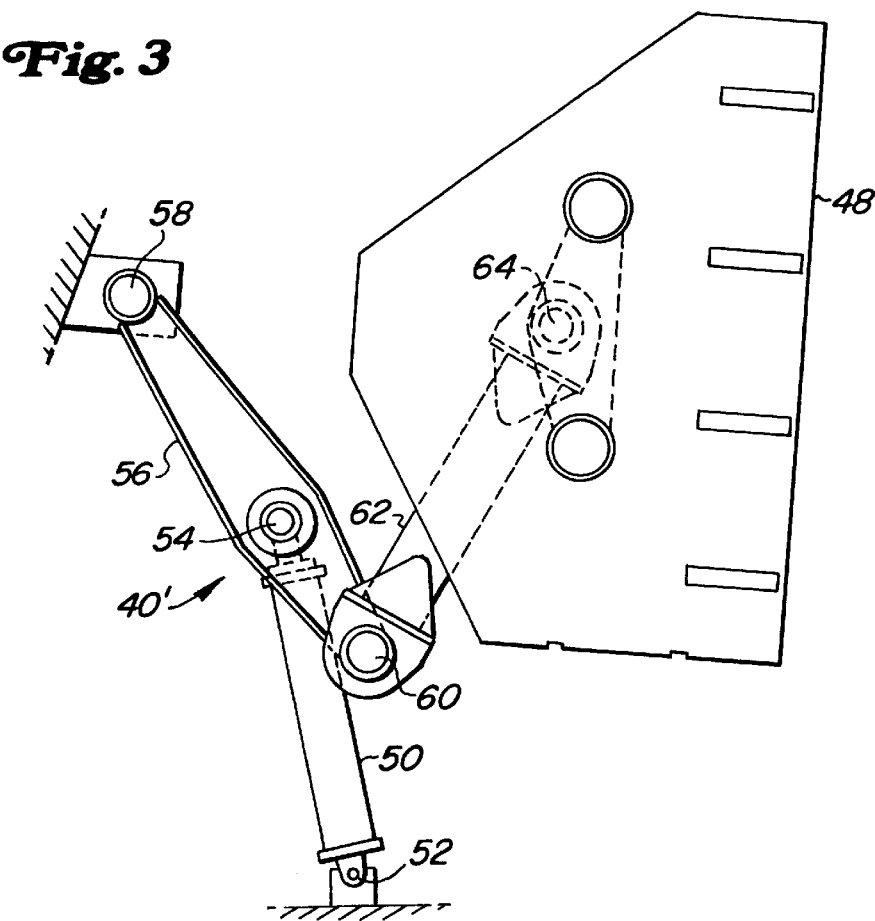
FIG. 3 is a side elevational view of an optional arrangement of the plunger actuator and slider-crank mechanism showing the slider crank mechanism and the plunger retracted, as in FIG. 1, but, in this arrangement, also showing the actuator fully retracted.

Referring now to FIG. 3, there is shown a plunger mechanism 40' which differs from the mechanism 40 by having the crank arm 56 and connecting rod 62 located so as to form a mirror image of their positions shown in FIG. 1, relative to the line of centers C. The most significant result of this rearrangement of the arm 56 and connecting rod 62 is that the actuator 50 is now fully retracted when the plunger 48 is fully retracted, as shown. Thus, extension of the actuator 50 causes extension of the plunger 48 and pressurized fluid routed to the cylinder end of the actuator will act on the larger surface area of the piston, it being noted that the area occupied by the rod on the rod side of the piston is not available for doing work.

Figure 4:
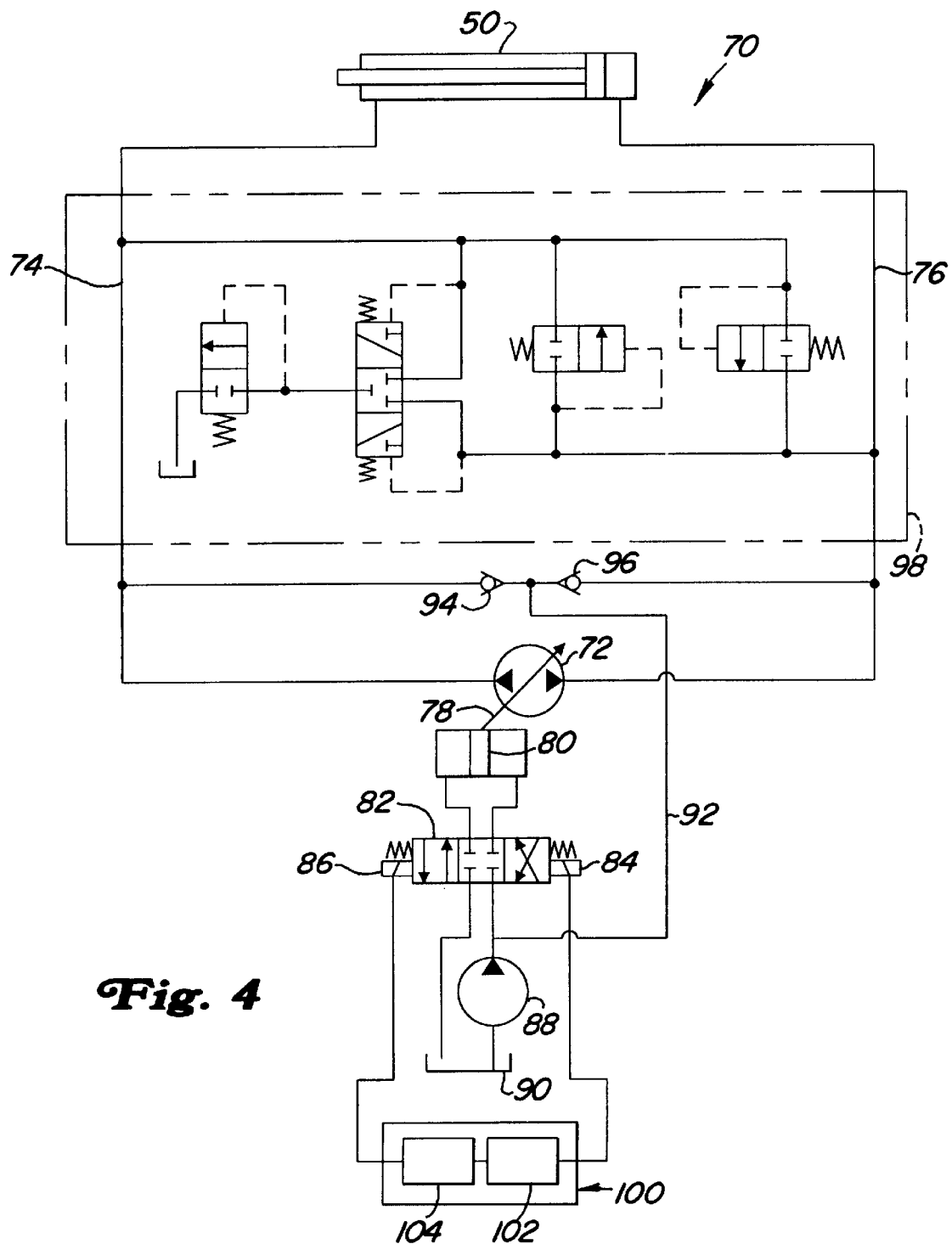
FIG. 4 is a schematic of the electro-hydraulic circuit used to control operation of the plunger actuator.

Referring now to FIG. 4, there is shown an electro-hydraulic control circuit 70 for controlling operation of the plunger actuator 50. Specifically, the control circuit 70 includes a reversible, variable displacement pump 72 having first and second ports respectively coupled to the cylinder and rod end of the actuator 50 by supply/return conduit 74 and 76. The pump 72 includes a swash plate 78 movable, by a hydraulic control here indicated as a piston 80, in increasing amounts to opposite sides of a centered neutral position to effect increasing fluid displacement, the piston 80 being shown in a centered position where it holds the swash plate 78 in a neutral position, zero-displacement position. Control of the piston 80, and hence control of the direction and displacement of fluid from the pump 72, is effected by a spring-centered, solenoid-operated three-position swash plate control valve 82 having forward and reverse solenoids 84 and 86, respectively, at its opposite ends which are selectively energized to cause the piston 80 to be respectively shifted increasingly leftwardly and rightwardly from its illustrated neutral position to respectively effect increased fluid displacement to the pressure/return lines 74 and 76 so as to effect retraction and extension of the hydraulic cylinder 50. Specifically, energization of the forward solenoid 84 causes the valve 82 to shift rightwardly to connect a fixed displacement pump 88 with a base end of a cylinder containing the piston 80 while connecting the rod end of the cylinder to a sump 90. On the other hand, energization of the reverse solenoid 86 causes the valve 82 to shift leftwardly resulting in the pump 88 being connected to the rod end of the cylinder containing the piston 80 while connecting the base end of the cylinder to the sump 90. Replacement or charge pressure fluid is introduced into the lines 74 and 76, respectively, by way of a branched charge pressure line 92 containing check valves 94 and 96 which operate so that fluid is introduced into which ever one of the lines 74 and 76 contains fluid at the lower pressure. Coupled between the pressure/return lines 74 and 76 is a valve assembly 98 containing charge and high pressure relief valving, as is well known in the art.

Actuation of the solenoids 84 and 86 is carried out by an electrical control, indicated functionally at 100, containing position responsive switch elements 102 and 104, respectively, which are actuated in response to the respective positions of the stuffer fork mechanism 36 and the plunger mechanism 40 so that actuation of the solenoids shifts the swash plate position control valve 82 in the appropriate direction for causing desired operation of the plunger actuator 50. Specifically, assuming the plunger 48 to be fully retracted and the stuffer fork mechanism to be at its stand-by position shown in FIG. 1, the switch components 102 and 104 will operate to effect an open circuit between a source of electrical power (not shown) and the valve solenoids 84 and 82. Thus the swash plate 78 of the pump 72 will be in its centered, zero displacement condition. Once crop is moved into the duct 26 and is precompressed to the desired density, the pressure plate 38 will initiate a drive connection (not shown) to the stuffer fork mechanism 36 which will cause the latter to be driven to sweep its forks upwardly through the duct 26 to move a charge of crop into the bale case 18. The position sensing component 102 then effects operation of a switch which couples the valve solenoid 84 to the source of electrical power. Upon being energized, the solenoid 84 effects shifting of the swash plate control valve 82 so that the pump swash plate 78 is pivoted to effect maximum displacement of fluid to the rod end of the plunger actuator 50. This causes the actuator 50 to retract and move the plunger 48 rearwardly to its fully extended position shown in FIG. 2. The position sensing component 104 then senses condition of the plunger mechanism and operates, in response to one or the other of the components 48, 56 or 62 being positioned as it is when the plunger 48 is fully extended, as shown in FIG. 2, to effect opening of the circuit previously completed by operation of the component 102 and to effect closing of a circuit for connecting the source of electrical power to the solenoid 86. This results in the valve 82 first returning to its centered neutral position and then in being shifted leftwardly so that the pump swash plate 78 is pivoted to effect maximum displacement of fluid to the head end of the plunger actuator so that it extends to retract the plunger 48 to its retracted position shown in FIG. 1. Upon the plunger 48 approaching its fully retracted position, the sensing component 104 acts to cause the circuit to the solenoid 86 to open so that the valve 82 once again is moved to its centered neutral position with the result that the swash plate 78 is once again returned to its centered, zero displacement position.

Operation of the position sensing components 102 and 104 when used in conjunction with the plunger mechanism 40' of FIG. 3 is exactly the same as when used with the plunger mechanism 40 except that the valve 82 is reversed so that extension of the plunger 48 is effected in response to extension of the actuator 50 and retraction of the plunger 48 is effected in response to retraction of the actuator 50.

Figure 5:
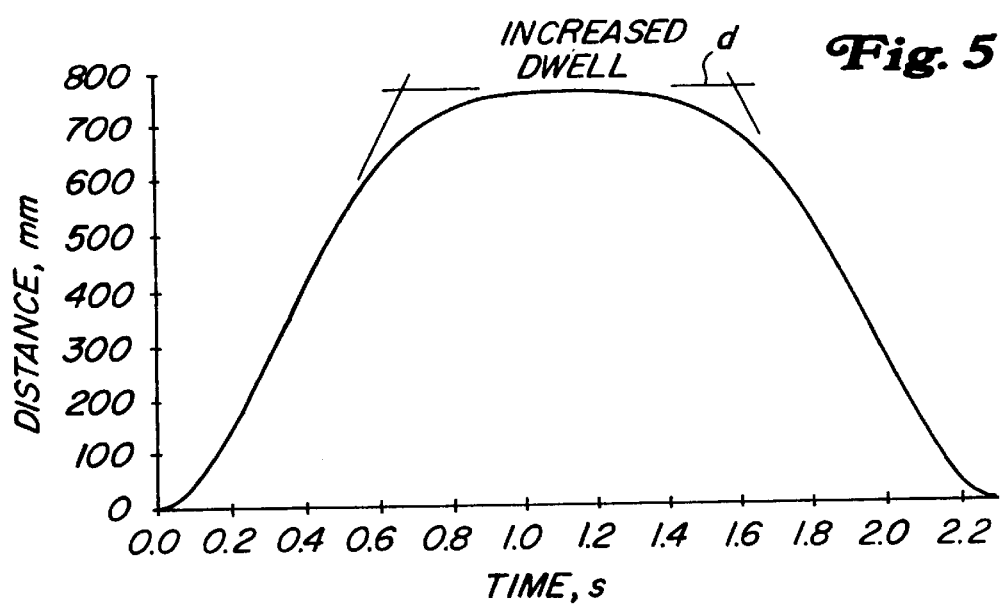
FIG. 5 is a graph showing the plunger position as a function of time during one cycle of the plunger.

Referring now to FIG. 5, there is shown a graph plotting the position of the plunger 48 versus time during one cycle of the plunger 48 as it moves from its retracted position to its extended position and then back to its retracted position. It can be seen that there is a relatively flat dwell segment d in the graph which occurs at the point in the cycle that corresponds to the time when the pump swash plate 78 is going through its neutral, zero displacement position as it goes from its fully swashed position, where a maximum displacement of fluid is occurring through the supply/return conduit 74 for effecting retraction (extension in the embodiment shown in FIG. 3) of the actuator 50 and extension of the plunger 48, to its zero-displacement position and then to its fully swashed position in the opposite direction for causing a maximum displacement of fluid through the supply/return conduit 76 for effecting extension of the actuator 50 (retraction in the embodiment shown in FIG. 3) and retraction of the plunger 48. This dwell d does not occur in a plunger system where the crank arm 56 is driven through 360° as by a gear drive, for example. In such a drive the displacement-versus-time graph is a pure sinusoid with only a point at the top of the curve representing the occurrence of the crank arm rotating past the position where the plunger is fully extended and returning toward the position where the plunger is fully retracted. The occurrence of the dwell d is thought important from the standpoint that by holding the compressed hay for the dwell period, here shown as being approximately 0.8 seconds, as the compressed crop then has less of a tendency to spring back once the plunger moves away. This results in a denser bale being formed. Further, the dwell period results in the plunger 48 retaining the compressed crop out of the way for an adequate period of time for permitting the uninhibited passage of the needles of the twine delivery mechanism 42 through the bale case 18 to carry the twine to the knotters and then to return to its illustrated stand-by position.

We claim:

1. In a baler, for forming parallelepiped bales, including an elongate bale case having a central longitudinal axis and having a crop inlet in one of its walls, a plunger reciprocably mounted in said bale case for moving between fully retracted and extended positions, respectively, wherein a compaction face of said plunger is located at opposite first and second sides of said crop inlet, and a plunger actuating mechanism including at least one extensible and retractable hydraulic actuator for effecting movement of said plunger between said fully retracted and extended positions, the improvement comprising: said plunger actuating mechanism including a crank arm mounted for pivoting about a fixed axis extending transversely to said longitudinal axis of said elongate bale case; a connecting rod having opposite ends respectively pivotally attached to said crank arm and to said plunger; and said at least one extensible and retractable hydraulic actuator being connected for oscillating said crank arm between a first position, corresponding to said fully retracted position of said plunger, wherein said crank arm makes an acute angle with said connecting rod, and a second position, corresponding to said fully extended position of said plunger.

2. The baler defined in claim 1 wherein said crank arm and connecting rod are so sized and arranged relative to said hydraulic actuator that the hydraulic actuator has a stroke length which is approximately one half of the distance through which said plunger moves when travelling between said fully retracted and extended positions.

3. The baler defined in claim 1 wherein said actuator is pivotally coupled to a location between opposite ends of said crank arm such that a mechanical advantage developed by said hydraulic actuator acting on said crank arm and connecting rod increases as said plunger moves towards said fully extended position.

4. A baler for making parallelepiped bales, comprising: an elongate baling chamber defined by top, bottom, and opposite side walls joined together so as to have a rectangular cross section: a crop inlet located in one of said walls; a plunger mounted for reciprocating in said baling chamber between a fully retracted position wherein a crop engaging face is at one side of said crop inlet and a fully extended position wherein said crop-engaging face of said plunger is at an opposite side of said crop inlet from said one side; a plunger drive mechanism, for moving the plunger between said fully retracted and extended positions, including a crank arm mounted for swinging about a fixed axis extending transversely to a long dimension of said baling chamber, a connecting rod having opposite ends respectively pivotally attached to said crank arm and said plunger, and cooperating with said crank arm to form a toggle linkage which is in alignment with said fixed axis when the plunger is in said fully extended position; and an extensible and retractable hydraulic actuator coupled for extending and collapsing said toggle linkage to thereby respectively move said plunger from said fully retracted to said fully extended position and then back to said fully retracted position.

5. The baler defined in claim 4 wherein said crank arm, connecting rod and said hydraulic actuator, as considered lengthwise, are so positioned one to the other that said hydraulic actuator is substantially vertical when said toggle linkage is extended.

6. The baler defined in claim 4 wherein said crank arm and connecting rod lie along a line which is substantially coincident with a longitudinal centerline of said baling chamber when said plunger is in said fully extended position.

7. The baler defined in claim 6 wherein said pivotal connection between the crank arm and connecting rod is spaced above said centerline when said toggle link formed by said arm and rod is collapsed, and said hydraulic actuator then being fully extended so that said plunger is pushed by contraction of said actuator when compacting crop material fed into the baling chamber by way of said inlet.

8. The baler defined in claim 6 wherein said pivotal connection between the crank arm and connecting rod is spaced below said centerline when said toggle linkage formed by said arm and rod is collapsed, and said hydraulic actuator then being fully contracted so that said plunger is pushed by extension of the actuator when compacting crop material fed into the baling chamber by way of said inlet.

\* \* \* \* \*